United States Patent
Hart (10) Patent No.: US 11,221,285 B2
(45) Date of Patent: Jan. 11, 2022

(54) SYSTEM AND METHOD FOR INSPECTING SECONDARY BONDS IN LAMINATED PARTS

(71) Applicant: The Boeing Company, Chicago, IL (US)

(72) Inventor: Marcus C. Hart, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 16/778,714

(22) Filed: Jan. 31, 2020

(65) Prior Publication Data

US 2021/0239585 A1 Aug. 5, 2021

(51) Int. Cl.
*G01N 3/24* (2006.01)
*G01N 3/06* (2006.01)

(52) U.S. Cl.
CPC ............... *G01N 3/24* (2013.01); *G01N 3/068* (2013.01); *G01N 2203/0234* (2013.01); *G01N 2203/0296* (2013.01); *G01N 2203/0647* (2013.01)

(58) Field of Classification Search
CPC .. G01N 3/24; G01N 3/068; G01N 2203/0234; G01N 2203/0296; G01N 2203/0647
See application file for complete search history.

(56) References Cited

U.S. PATENT DOCUMENTS

| | | | |
|---|---|---|---|
| 6,246,483 B1* | 6/2001 | Smith | G01B 11/162 356/35.5 |
| 7,820,271 B2* | 10/2010 | Rasmussen | B65D 65/403 428/182 |
| 10,670,491 B1* | 6/2020 | Satai | G01N 23/203 |
| 2008/0171189 A1* | 7/2008 | Varga | G01M 3/045 428/306.6 |
| 2011/0135546 A1* | 6/2011 | Kurowski | B29C 66/53461 422/502 |
| 2017/0192051 A1* | 7/2017 | Hugo | G01R 31/2849 |
| 2018/0281923 A1 | 10/2018 | Walker et al. | |
| 2018/0372603 A1* | 12/2018 | Safai | G01N 3/24 |

* cited by examiner

*Primary Examiner* — Max H Noori
(74) *Attorney, Agent, or Firm* — Kunzler Bean & Adamson (57) ABSTRACT

A method of inspecting a secondary bond of a laminated part includes positioning the laminated part within a sealed chamber. The method also includes reducing a pressure within the sealed chamber to below a pressure outside the sealed chamber when the laminated part is positioned within the sealed chamber. The method further includes, when the pressure within the sealed chamber is reduced to below the pressure outside the sealed chamber, measuring a gradient of change of a surface profile of the laminated part. The method additionally includes determining a condition of the secondary bond based on the gradient of change of the surface profile of the laminated part.

20 Claims, 9 Drawing Sheets

SYSTEM AND METHOD FOR INSPECTING SECONDARY BONDS IN LAMINATED PARTS

FIELD

This disclosure relates generally to the inspection of parts for abnormalities, and more particularly to the inspection of secondary bonds formed in laminated parts.

BACKGROUND

Some laminated parts include layers coupled together by secondary bonds. The condition of secondary bonds within a laminated part affects the strength, performance, and integrity of the laminated part. Accordingly, determining the condition of secondary bonds in laminated parts can be important.

Some secondary bonds that otherwise appear to be in good condition through physical contact but may nevertheless not provide optimal adhesion between layers of a laminated part. Such bonds are termed kissing bonds and can be difficult to detect with some conventional inspection techniques, such as transmission and pulse echo inspection techniques. Kissing bonds can be detectable using other conventional inspection techniques, such as or laser bond inspection techniques. However, these latter conventional inspection techniques are typically limited to small inspection areas and thus are less efficient, from a time management perspective, when inspecting large areas. Accordingly, inspecting the condition of secondary bonds over large areas in an accurate and timely manner can be difficult.

SUMMARY

The subject matter of the present application has been developed in response to the present state of the art, and in particular, in response to the shortcomings of secondary bond inspection techniques, that have not yet been fully solved by currently available techniques. Accordingly, the subject matter of the present application has been developed to provide a system and method for inspecting secondary bonds in laminated parts that overcome at least some of the above-discussed shortcomings of prior art techniques.

The following is a non-exhaustive list of examples, which may or may not be claimed, of the subject matter, disclosed herein.

Disclosed herein is a method of inspecting a secondary bond of a laminated part. The method comprises positioning the laminated part within a sealed chamber. The method also comprises reducing a pressure within the sealed chamber to below a pressure outside the sealed chamber when the laminated part is positioned within the sealed chamber. The method further comprises, when the pressure within the sealed chamber is reduced to below the pressure outside the sealed chamber, measuring a gradient of change of a surface profile of the laminated part. The method additionally comprises determining a condition of the secondary bond based on the gradient of change of the surface profile of the laminated part. The preceding subject matter of this paragraph characterizes example 1 of the present disclosure.

The gradient of change of the surface profile of the laminated part is measured using a laser shearography process. The preceding subject matter of this paragraph characterizes example 2 of the present disclosure, wherein example 2 also includes the subject matter according to example 1, above.

The laminated part comprises an internal pocket. The step of determining the condition of the secondary bond comprises determining the condition of the secondary bond as good when the gradient of change of the surface profile of the laminated part indicates a bulge in the laminated part having a size, shape, and location corresponding with a size, shape, and location of the internal pocket. The step of determining the condition of the secondary bond comprises determining the condition of the secondary bond as bad when the gradient of change of the surface profile of the laminated part indicates a bulge in the laminated part having a size, shape, and location that does not correspond with the size, shape, and location of the internal pocket. The preceding subject matter of this paragraph characterizes example 3 of the present disclosure, wherein example 3 also includes the subject matter according to any one of examples 1-2, above.

The step of determining the condition of the secondary bond as bad when the gradient of change of the surface profile of the laminated part indicates the bulge in the laminated part has a size that is bigger than the size of the internal pocket. The preceding subject matter of this paragraph characterizes example 4 of the present disclosure, wherein example 4 also includes the subject matter according to example 3, above.

The laminated part further comprises a plurality of internal pockets spaced apart from each other. The size, shape, and location of the bulge in the laminated part does not correspond with the size, shape, and location of the internal pocket when the bulge traverses at least two of the plurality of internal pockets. The preceding subject matter of this paragraph characterizes example 5 of the present disclosure, wherein example 5 also includes the subject matter according to any one of examples 3-4, above.

The laminated part further comprises a plurality of internal pockets spaced apart from each other. The gradient of change of the surface profile of the laminated part indicates a plurality of bulges in the laminated part. The condition of the secondary bond is determined as good when the size, shape, and location of each one of the plurality of bulges corresponds with the size, shape, and location of a corresponding one of the plurality of internal pockets. The condition of the secondary bond is determined as bad when the size, shape, and location of any one of the plurality of bulges does not correspond with the size, shape, and location of the corresponding one of the plurality of internal pockets. The preceding subject matter of this paragraph characterizes example 6 of the present disclosure, wherein example 6 also includes the subject matter according to any one of examples 3-5, above.

The laminated part comprises an internal pocket having a predetermined configuration. The step of determining the condition of the secondary bond comprises comparing the gradient of change of the surface profile of the laminated part with the predetermined configuration of the internal pocket. The preceding subject matter of this paragraph characterizes example 7 of the present disclosure, wherein example 7 also includes the subject matter according to any one of examples 1-6, above.

The laminated part further comprises a plurality of internal pockets arranged in a predetermined pattern. The step of determining the condition of the secondary bond comprises comparing the gradient of change of the surface profile of the laminated part with the predetermined pattern of the plurality of internal pockets. The preceding subject matter of this paragraph characterizes example 8 of the present disclosure, wherein example 8 also includes the subject matter according to any one of examples 1-7, above.

The laminated part comprises an internal pocket having a predetermined configuration. The step of measuring the gradient of change of the surface profile of the laminated part comprises creating a first digital image of the gradient of change of the surface profile of the laminated part. The step of determining the condition of the secondary bond comprises automatedly comparing the first digital image of the gradient of change of the surface profile of the laminated part with a second digital image comprising a representation of the internal pocket having the predetermined configuration. The preceding subject matter of this paragraph characterizes example 9 of the present disclosure, wherein example 9 also includes the subject matter according to any one of examples 1-8, above.

The laminated part comprises a first layer, an intermediate layer adjacent the first layer, and at least a portion of an adhesive between the intermediate layer and the first layer that bonds the intermediate layer to the first layer and forms the secondary bond between the intermediate layer and the first layer. The preceding subject matter of this paragraph characterizes example 10 of the present disclosure, wherein example 10 also includes the subject matter according to any one of examples 1-9, above.

The first layer comprises a plurality of sub-layers. The preceding subject matter of this paragraph characterizes example 11 of the present disclosure, wherein example 11 also includes the subject matter according to example 10, above.

The intermediate layer comprises an opening. The laminated part further comprises an internal pocket defined by the opening and the first layer. The step of determining the condition of the secondary bond comprises determining the condition of the secondary bond as good when the gradient of change of the surface profile of the laminated part indicates a bulge in the laminated part having a size, shape, and location corresponding with a size, shape, and location of the internal pocket. The step of determining the condition of the secondary bond comprises determining the condition of the secondary bond as bad when the gradient of change of the surface profile of the laminated part indicates a bulge in the laminated part having a size, shape, and location that does not correspond with the size, shape, and location of the internal pocket. The preceding subject matter of this paragraph characterizes example 12 of the present disclosure, wherein example 12 also includes the subject matter according to any one of examples 10-11, above.

The laminated part comprises a first layer. The laminated part also comprises a second layer. The laminated part further comprises an intermediate layer interposed between the first layer and the second layer. The laminated part additionally comprises an adhesive between the intermediate layer and the first layer, where the adhesive bonds the intermediate layer to the first layer and forms a first secondary bond between the intermediate layer and the first layer, and between the intermediate layer and the second layer, where the adhesive bonds the intermediate layer to the second layer and forms a second secondary bond between the intermediate layer and the first layer. The secondary bond of the laminated part, the condition of which is determined based on the gradient of change of the surface profile of the laminated part, is any one of the first secondary bond or the second secondary bond. The preceding subject matter of this paragraph characterizes example 13 of the present disclosure, wherein example 13 also includes the subject matter according to any one of examples 1-12, above.

The intermediate layer comprises an opening that extends entirely through a thickness of the intermediate layer. The laminated part further comprises an internal pocket defined by the opening, the first layer, and the second layer. The step of determining the condition of the secondary bond comprises determining the condition of the secondary bond as good when the gradient of change of the surface profile of the laminated part indicates a bulge in the laminated part having a size, shape, and location corresponding with a size, shape, and location of the internal pocket. The step of determining the condition of the secondary bond comprises determining the condition of the secondary bond as bad when the gradient of change of the surface profile of the laminated part indicates a bulge in the laminated part having a size, shape, and location that does not correspond with the size, shape, and location of the internal pocket. The preceding subject matter of this paragraph characterizes example 14 of the present disclosure, wherein example 14 also includes the subject matter according to example 13, above.

Each of the first layer, the second layer, and the intermediate layer comprises one or more layers of fiber-reinforced polymeric material. The preceding subject matter of this paragraph characterizes example 15 of the present disclosure, wherein example 15 also includes the subject matter according to example 14, above.

Further disclosed herein is a system for inspecting a secondary bond of a laminated part. The system comprises a sealed chamber, configured to contain the laminated part in a sealed environment. The system also comprises a vacuum device, configured to reduce pressure within the sealed chamber to below a pressure outside the sealed chamber. The system further comprises a shearography apparatus, configured to measure a gradient of change of a surface profile of the laminated part. The system additionally comprises a comparison module, configured to determine a condition of the secondary bond based on the gradient of change of the surface profile of the laminated part. The preceding subject matter of this paragraph characterizes example 16 of the present disclosure.

The laminated part comprises an internal pocket and the comparison module is configured to analyze the gradient of change of the surface profile of the laminated part measured by the shearography apparatus. The comparison module is also configured to determine the condition of the secondary bond as good when the gradient of change of the surface profile of the laminated part indicates a bulge in the laminated part having a size, shape, and location corresponding with a size, shape, and location of the internal pocket. The comparison module is further configured to determine the condition of the secondary bond as bad when the gradient of change of the surface profile of the laminated part indicates a bulge in the laminated part having a size, shape, and location that does not correspond with the size, shape, and location of the internal pocket. The preceding subject matter of this paragraph characterizes example 17 of the present disclosure, wherein example 17 also includes the subject matter according to example 16, above.

The internal pocket has a predetermined configuration. The shearography apparatus is configured to create a first digital image of the gradient of change of the surface profile of the laminated part. The comparison module is configured to automatedly compare the first digital image of the gradient of change of the surface profile of the laminated part with a second digital image comprising a representation of the internal pocket having the predetermined configuration and determine the condition of the secondary bond based on the comparison of the first digital image with the second digital image. The preceding subject matter of this paragraph characterizes example 18 of the present disclosure, wherein example 18 also includes the subject matter according to example 17, above.

The laminated part further comprises a plurality of internal pockets spaced apart from each other according to a predetermined pattern. The shearography apparatus is configured to automatedly compare the first digital image of the gradient of change of the surface profile of the laminated part. The comparison module is configured to automatedly compare the first digital image of the gradient of change of the surface profile of the laminated part with a second digital image comprising a representation of the plurality of internal pockets arranged in the predetermined pattern. The comparison module is also configured to determine the condition of the secondary bond based on the comparison of the first digital image with the second digital image. The preceding subject matter of this paragraph characterizes example 19 of the present disclosure, wherein example 19 also includes the subject matter according to any one of examples 16-18, above.

The laminated part further comprises a plurality of internal pockets and the comparison module is configured to analyze the gradient of change of the surface profile of the laminated part measured by the shearography apparatus. The gradient of change of the surface profile of the laminated part indicates a plurality of bulges in the laminated part. The comparison module is also configured to determine the condition of the secondary bond as good when a size, shape, and location of each one of the plurality of bulges corresponds with a size, shape, and location of a corresponding one of the internal pocket. The comparison module is further configured determine the condition of the secondary bond as bad when the size, shape, and location of any one of the plurality of bulges does not correspond with the size, shape, and location of the corresponding one of the plurality of internal pockets. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The system and method of the present disclosure improve the inspection of secondary bonds over large areas of laminated parts by using shearography techniques. The laminated parts include features that result in bulges in the surface profile of the laminated part when the laminated part is subject to a reduce pressure environment (e.g., below atmospheric pressure). The bulges or gradients of change of the surface profile of the laminated part are detectable using shearography techniques. By knowing the configuration of the bulges associated with good secondary bonds of the laminated structure, a quick and accurate determination of the condition of the secondary bonds of the laminated structure can be made. More specifically, actual bulges in the laminated part are compared to predicted or expected bulges in the laminated part to determine the condition of secondary bonds of the laminated part.

Figure 1:
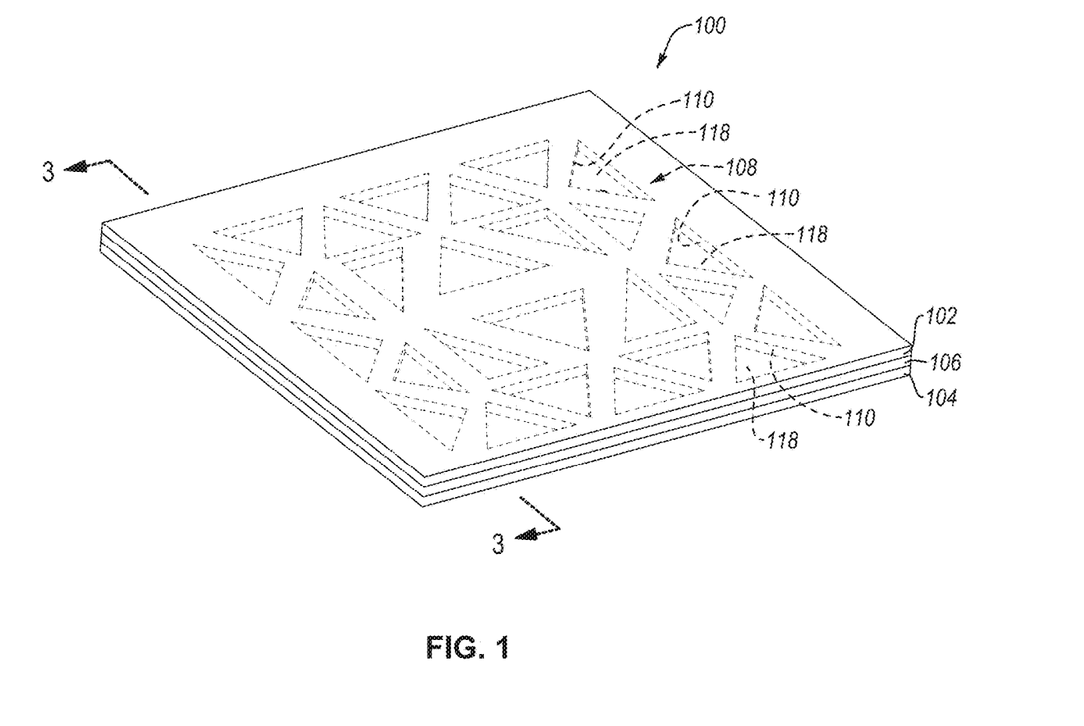
FIG. 1 is a perspective view of a laminated part, according to one or more examples of the present disclosure.

Referring to FIG. 1, according to one example, a laminated part 100 of the present disclosure includes a first layer 102 and a second layer 104. The laminated part 100 also includes an intermediate layer 106 that is interposed between the first layer 102 and the second layer 104. The intermediate layer 106 includes a plurality of openings 110 that are spaced apart from each other and arranged into a pattern. In the example of FIG. 1, the openings 110 are through-openings that extend entirely through a thickness of the intermediate layer 106. The first layer 102 is bonded to a first side 107 (see, e.g., FIG. 2) of the intermediate layer 106 to close a first side of the openings 110. Similarly, the second layer 104 is bonded to a second side 109 (see, e.g., FIG. 2) of the intermediate layer 106 to close a second side of the openings 110. The closure of the first and second sides of the openings 110 by the first layer 102 and the second layer 104, respectively, creates a plurality of internal pockets 118 of the laminated part 100.

Each one of the plurality of openings 110 corresponds with one of the plurality of internal pockets 118. Accordingly, in the example of FIG. 1, each one of the internal pockets 118 is defined by a corresponding opening 110, the first layer 102, and the second layer 104. In other words, each one of the internal pockets 118 is defined between the first layer 102, the second layer 104, and the sidewall of the intermediate layer 106 that defines the corresponding opening 110. The plurality of internal pockets 118 are arranged in a pattern 108 that corresponds with the pattern of the openings 110.

Figure 2:
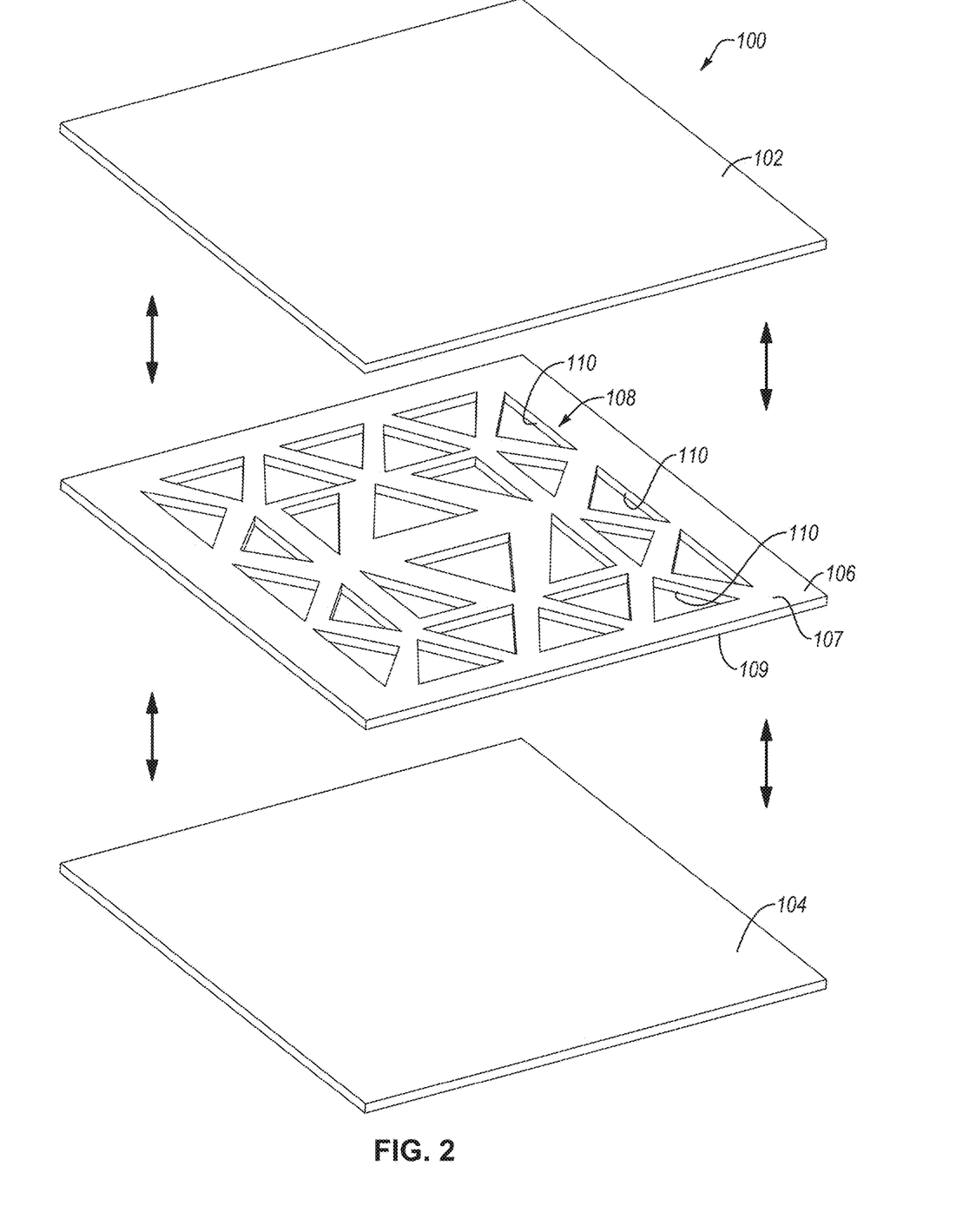
FIG. 2 is an exploded perspective view of the laminated part of FIG. 1, according to one or more examples of the present disclosure.

As shown in FIGS. 1 and 2, in one example, the pattern 108 of the plurality of internal pockets 118 is symmetrical about at least one plane. Moreover, in the illustrated example, each one of the internal pockets 118 has a triangular shape. Symmetrical patterns and internal pockets 118 with common shapes make it easier to detect abnormal bulges in the laminated part 100, as will be explained below. Moreover, the pattern is such that the spacing between adjacent internal pockets 118 of the laminated part 100 is the same, which also helps to detect abnormal bulges. The pattern 108 is spread out over at least a majority of the surface area of the laminated part 100 in some examples, which promotes a more comprehensive inspection of the secondary bonds 114 of the laminated part 100. In some examples, the intermediate layer 106 is considered a waffle layer such that the laminated part 100 has a waffle grid structure. Notwithstanding the above, in alternative examples, the internal pockets 118 are arranged in an asymmetrical pattern (e.g., non-symmetrical about any plane), have shapes other than triangular, are non-uniformly spaced, and/or are spread out over less than a majority of the surface. In certain alternative examples, the laminated part 100 has only a single internal pocket 118.

Figure 3:
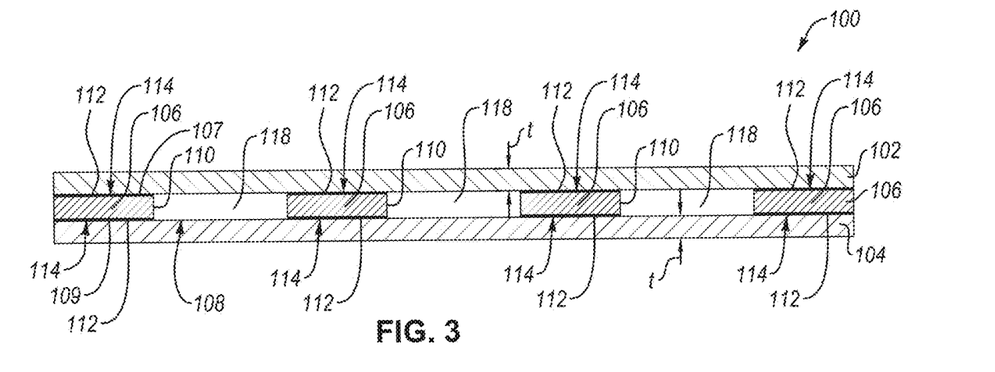
FIG. 3 is a cross-sectional side elevation view of the laminated part of FIG. 1, taken along the line 3-3 of FIG. 1, according to one or more examples of the present disclosure.

Referring to FIG. 3, the first layer 102 of the laminated part 100 is bonded to the intermediate layer 106 with an adhesive 112 and the second layer 104 of the laminated part 100 is bonded to the intermediate layer 106 with the adhesive 112. As used herein, the bond facilitated by the adhesive 112 is a secondary bond 114. The bond is considered a secondary bond 114 because it bonds together two individual components that were separately and previously manufactured in primary manufacturing steps before being bonded together by the secondary bond 114 in a secondary manufacturing step. Accordingly, the secondary bond 114 is different than (e.g., formed after and separately from) the bonds that bond together any sub-layers of the individual components bonded together by the secondary bond 114. In the case of two or more individual components made from curable resins and epoxies, uncured sub-layers of each individual component are bonded together during a co-curing of the sub-layers. The individual components, each having sub-layers previously co-cured together, are then bonded to each other with the secondary bond 114. In some instances, an uncured component with sub-layers is bonded to a cured component with sub-layers by affixing the uncured component with the cured component and curing the uncured component. The bond created between the previously cured component and the previously uncured component is not a secondary bond because the curing of one of the individual components creates the bond between the individual components. Therefore, in contrast to these examples of a non-secondary bond, a secondary bond is made between two or more previously cured components during a separate bonding process that occurs after the components have been cured.

The adhesive 112 is a thermoset adhesive, such as a curable epoxy or resin, in some examples. Accordingly, the secondary bond 114 can be formed during a curing step specifically aimed at curing the adhesive 112 between individual components (as opposed to curing the individual components themselves). In other examples, the adhesive 112 is a thermoplastic adhesive. A layer of the adhesive 112 directly bonds the intermediate layer 106 to the first layer 102 to create a first secondary bond 114 between the intermediate layer 106 and the first layer 102. Another layer of the adhesive 112 directly bonds the intermediate layer 106 to the second layer 104 to create a second secondary bond 114 between the intermediate layer 106 and the second layer 104. Accordingly, the laminated part 100 of FIG. 3 includes two secondary bonds 114 each on a corresponding one of opposite sides of the intermediate layer 106. Ideally, the adhesive 112 is uniformly applied to all faying or bonding surfaces of the layers being bonded together to create a proper secondary bond 114 (e.g., the layers are adequately bonded together by the adhesive 112). However, under some circumstances, such as application error, adhesive degradation, and environmental factors, the bond between layers may not adhere, but still be in contact. Such non-adhered bonding interfaces are sometimes referred to as "kissing bonds." The existence of kissing bonds can be difficult to detect with current inspection techniques. However, the system and method of the present disclosure promotes ease in inspecting and detecting kissing bonds in laminated parts over large areas.

Figure 4:
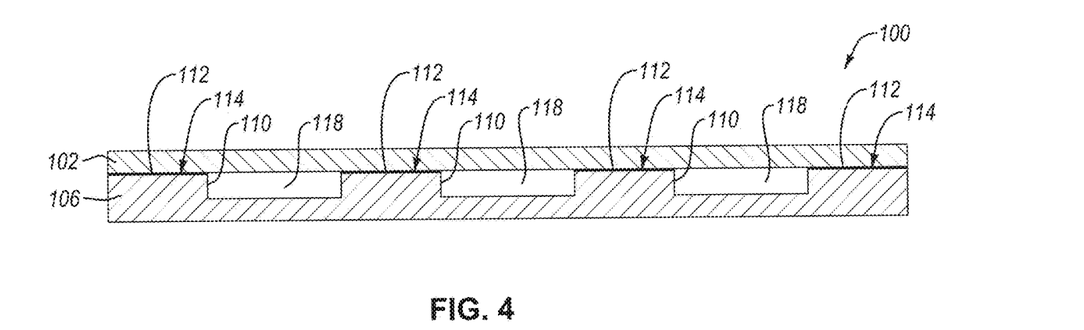
FIG. 4 is a cross-sectional side elevation view of a laminated part, taken along a line similar to the line 3-3 of FIG. 1, according to one or more examples of the present disclosure.

As used herein, a laminated part is a part that includes at least two layers (e.g., sub-parts, components, etc.) that are bonded together by a secondary bond 114. In the examples of FIGS. 1-3, the laminated part 100 includes three layers bonded together by two secondary bonds 114. However, as shown in FIG. 4, in some examples, the laminated part 100 includes only two layers bonded together by a secondary bond 114. In the example of FIG. 4, the laminated part 100 does not include a second layer 104, or put another way, the intermediate layer 106 acts as the second layer 104. Instead of the openings 110 in the intermediate layer 106 being through-openings, the openings 110 of the intermediate layer 106 of FIG. 4 are blind openings. Accordingly, the internal pockets 118 are defined only by the first layer 102 and the intermediate layer 106 in the example of FIG. 4.

Figure 5:
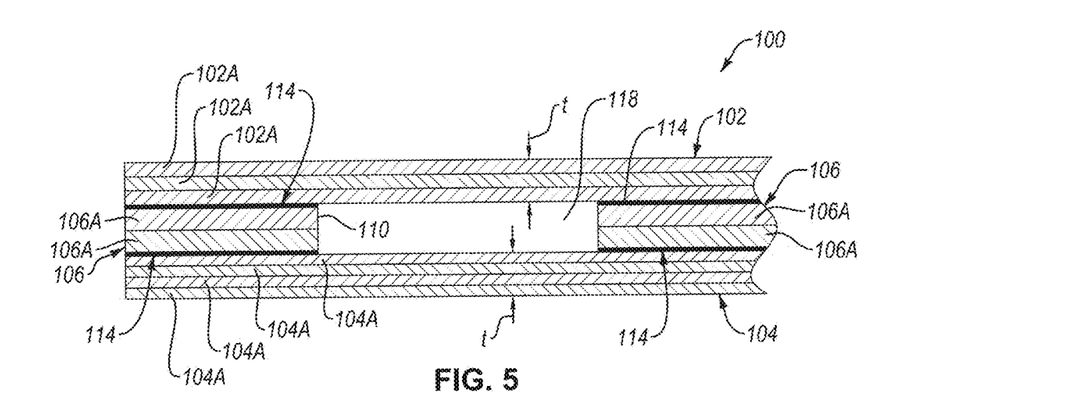
FIG. 5 is a cross-sectional side elevation view of a laminated part, taken along a line similar to the line 3-3 of FIG. 1, according to one or more examples of the present disclosure.

As mentioned above, in certain examples, as shown in FIG. 5, one or more of the first layer 102, the second layer 104, and the intermediate layer 106 includes multiple sub-layers. In the example of FIG. 5, the first layer 102 includes multiple sub-layers 102A, the second layer 104 includes multiple sub-layers 104A, and the intermediate layer 106 includes multiple sub-layers 106A. The sub-layers 102A of the first layer 102 are bonded together, such as by curing the sub-layers 102A together, the sub-layers 104A of the second layer 104 are bonded together, such as by curing the sub-layers 104A together, and the sub-layers 106A of the intermediate layer 106 are bonded together, such as by curing the sub-layers 106A together before the layers are bonded together with the second bonds 114.

The layers of the laminated part 100 are made from an isotropic material, such as a polymer or metal, in some examples. In other examples, the layers of the laminated part 100 are made from a non-isotropic or composite material, such as a fiber-reinforced polymeric material.

Figure 13:
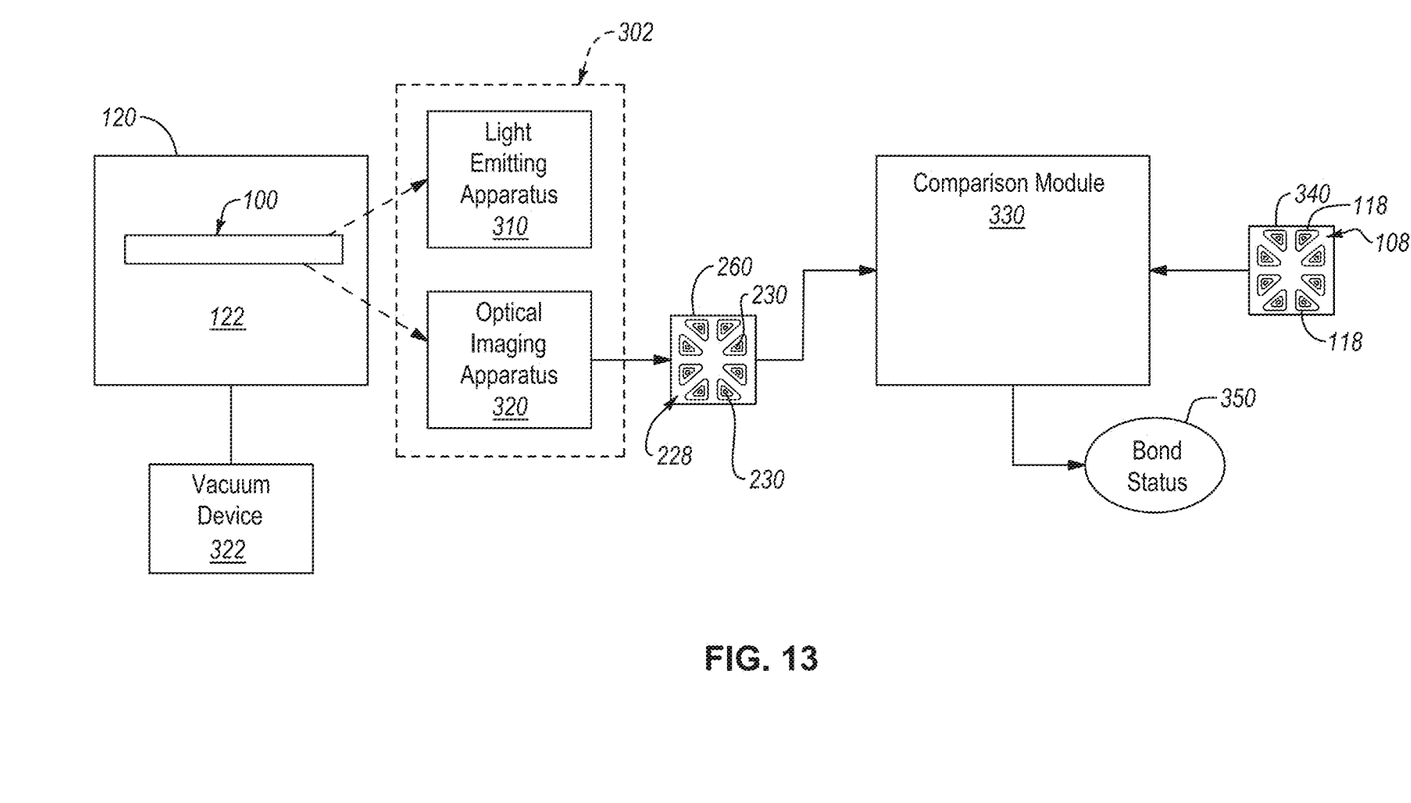
FIG. 13 is a schematic block diagram of a system for inspecting a secondary bond of a laminated part, according to one or more examples of the present disclosure.

Referring to FIG. 13, according to some examples, a system 300 for inspecting the secondary bond(s) 114 of the laminated part 100 is shown. The system 300 includes a sealed chamber 120. The sealed chamber 120 is openable, to allow access to an interior 122 of the sealed chamber 120, and closable to seal the interior 122 of the sealed chamber 120. Additionally, the sealed chamber 120 includes at least one transparent or translucent sidewall through which optical signals, from outside of the sealed chamber 120, can penetrate into the interior 122 of the sealed chamber 120 and reflect out of the sealed chamber 120 from the interior 122. In some examples, all the sidewalls of the sealed chamber 120 are transparent or translucent. In other examples, the shearography apparatus 302 is contained entirely within the sealed chamber 120.

The system 300 additionally includes a vacuum device 322 fluidically coupled with the sealed chamber 120 and operable to adjust the pressure in the interior 122 of the sealed chamber 120. In some examples, the vacuum device 322 is a pump that reduces the pressure inside the sealed chamber 120 from a first pressure P1 (see, e.g., FIG. 6) to a second pressure P2 (see, e.g., FIG. 7). Accordingly, the vacuum device 322 creates vacuum pressure within the sealed chamber 120 by reducing the pressure inside the sealed chamber 120 to below the pressure outside the sealed chamber 120. The first pressure P1 is atmospheric pressure and the second pressure P2 is less than atmospheric pressure in certain examples.

The system 300 also includes a shearography apparatus 302 that is configured to measure a gradient of change of a surface profile of the laminated part 100 when the laminated part 100 is inside the sealed chamber 120. More specifically, the shearography apparatus 302 is configured to generate a contour plot that shows the gradient of change of the surface profile of the laminated part 100. The shearography apparatus 302 can be a conventional shearography apparatus, such as one that includes a light emitting apparatus 310 and an optical imaging apparatus 320. Generally, the light emitting apparatus 310 illuminate the exterior surfaces of the laminated part 100, when inside the sealed chamber 120, with light (e.g., coherent light) and the reflected light (e.g., light reflected off of the exterior surfaces of the laminated part 100) is received by the optical imaging apparatus 320. The optical imaging apparatus 320 generates one or more digital images (see, e.g., digital image 260) based on the reflected light received from the laminated part 100. In some examples, the optical imaging apparatus 320 includes a camera that creates the digital image based on the reflected light. The shearography apparatus 302 facilitates the capture and display of highly sensitive measurements of the topography of the illuminated surfaces of the laminated part 100.

As shown in FIG. 13, the system 300 further includes a comparison module 330 that is configured to automatedly determine a condition of the secondary bond(s) 114 of the laminated structure 100 based on the gradient of change of the surface profile of the laminated part 100 measured by the shearography apparatus 302. In some examples, the comparison module 330 receives the digital image 260 or digital images from the shearography apparatus 302 and compares the digital image 260 with another digital image 340. The comparison can include analyzing the gradient change of the surface profile of the laminated part 100 provided in the digital image 260. In some examples, comparison between the digital images includes overlaying one image relative to another. When the gradient change of the surface profile indicates a bulge 130 with a size, shape, and location that corresponds with a size, shape, and location of a corresponding internal pocket 118 or a corresponding one of a plurality of internal pockets 118, then the comparison module 330 determines the secondary bond 114 is a good one and determines the secondary bond 114 is a bad one when there is a lack of correspondence.

The digital image 340 includes a representation of the internal pocket(s) 118 of the laminated part 100. More specifically, the digital image 340 is a preexisting digital image prepared prior to the shearography apparatus 302 measuring the gradient of change of the surface profile of the laminated part 100. Accordingly, the digital image 340 is prepared with preexisting information regarding the configuration of the internal pocket(s) 118 of the laminated part 100 to be made and inspected. In some examples, the internal pocket(s) of the digital image 340 are representations of the internal pocket(s) 118 before being subjected to the low-pressure environment in the sealed chamber 120 (i.e., in a non-bulging state). However, in other examples, the internal pocket(s) of the digital image 340 are representations of the internal pocket(s) 118 after being subjected to the low-pressure environment in the sealed chamber 120 (i.e., in a bulging state). The digital image 340 is prepared by a user and uploaded to the comparison module 330 in some examples.

The comparison module 330 uses any of various digital image comparison techniques to compare configuration of the internal pocket(s) 118 after being subjected to the low-pressure environment with the representation of the internal pocket(s) 118 and identify variations between the internal pocket(s) 118 represented in the digital image 340 and the actual internal pocket(s) 118 in the digital image 260. Such variations are indicative of a bad secondary bond 114 (e.g., such as a kissing bond). For example, as described in more detail below, an actual internal pocket 118 in the digital image 260 that is larger than or misshaped relative to a corresponding predicted internal pocket 118 of the digital image 340 is indicative of a bad secondary bond 114 (see, e.g., FIGS. 8 and 9). The comparison module 330 is configured to generate a bond status 350 that provides an identification of the status of the secondary bond(s) 114 as good or bad in response to the comparison. In some examples, the identification provided by the bond status 350 can be binary, such as good or bad (or any other binary identification of the condition of the secondary bond(s) 114 of the laminated part 100, such as, for example, green or red, healthy or poor, 1 or 0, etc.). However, in other examples, the identification provided by the bond status 350 may be non-binary, such as any one of various values along a bond condition scale.

Figure 6:
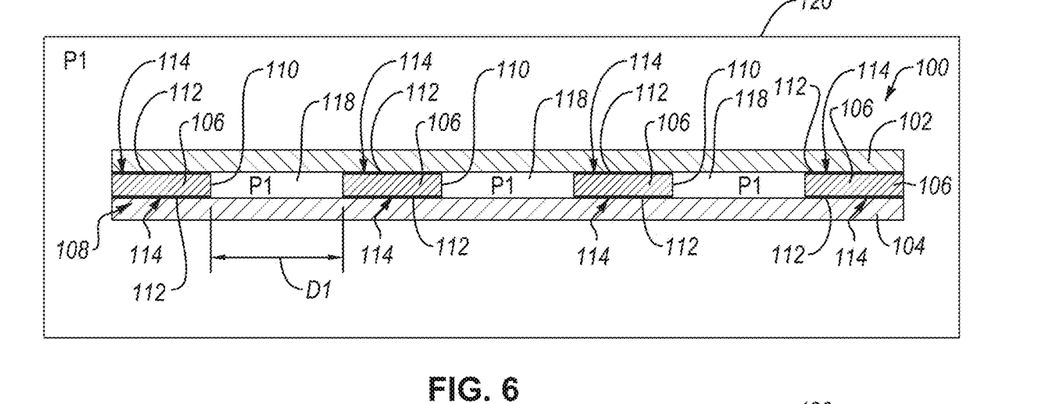
FIG. 6 is a cross-sectional side elevation view of the laminated part of FIG. 1, taken along the line 3-3 of FIG. 1 and shown positioned within a sealed chamber at a first pressure, according to one or more examples of the present disclosure.
Figure 14:
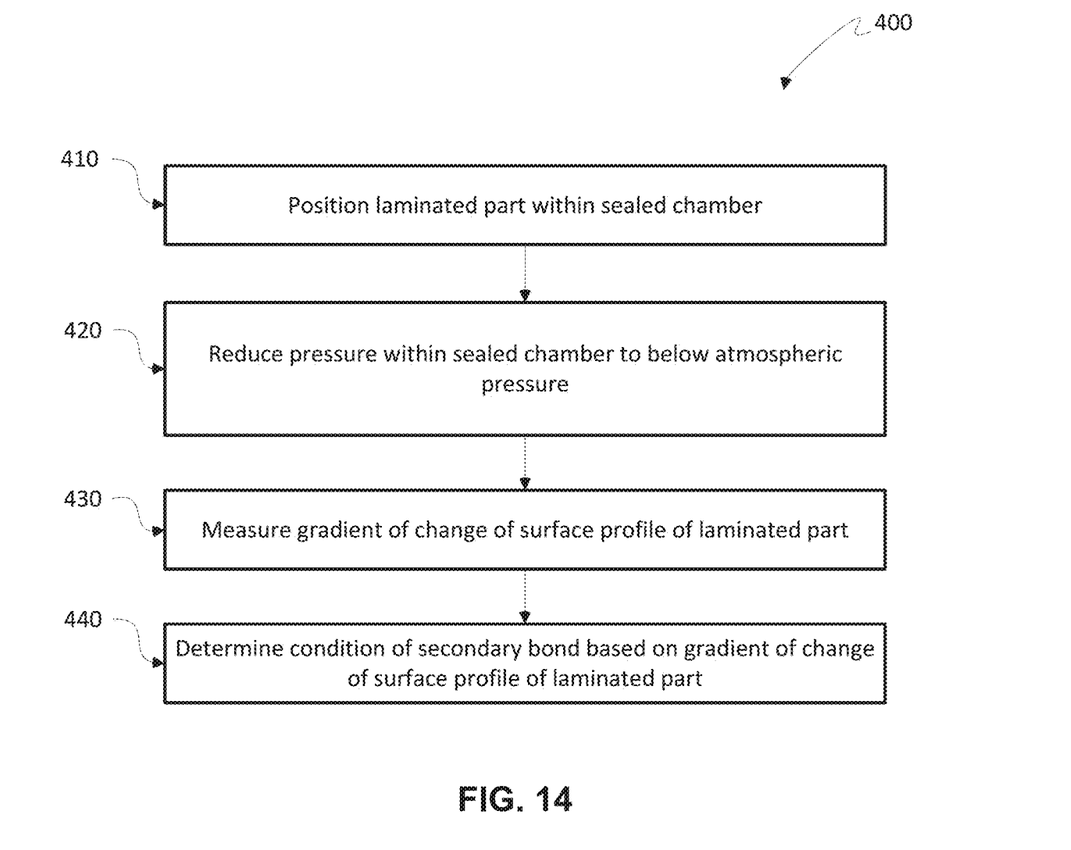
FIG. 14 is a schematic flow chart of a method of inspecting a secondary bond of a laminated part, according to one or more examples of the present disclosure.

Referring to FIG. 14, according to some examples, a method 400 of inspecting the secondary bond(s) 114 of the laminated part 100 is shown. In one example, the system 300 is used to execute the method 400. The method 400 includes (block 410) positioning the laminated part 100 within the sealed chamber 120 and closing/sealing the sealed chamber 120. As shown in FIG. 6, the laminated part 100 is positioned within the interior 122 of the sealed chamber 120. When initially placed in the sealed chamber 120, the pressure P1 within the interior 122 of the sealed chamber 120 is the same as outside the sealed chamber 120.

Figure 7:
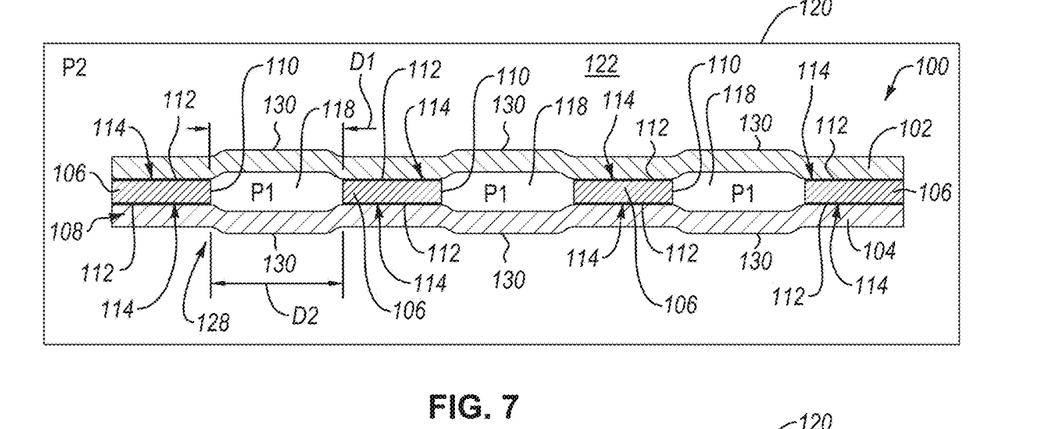
FIG. 7 is a cross-sectional side elevation view of the laminated part of FIG. 1, taken along the line 3-3 of FIG. 1, shown positioned within a sealed chamber at a second pressure below the first pressure and having good secondary bonds, according to one or more examples of the present disclosure.

With the laminated part 100 positioned within the interior 122 of the sealed chamber 120 and the sealed chamber 120 closed to seal the interior 122, the method 400 includes (block 420) reducing the pressure within the sealed chamber 120, with the vacuum device 322 for example, to below the pressure outside the sealed chamber 120. In one example, the pressure outside the sealed chamber 120 is at atmospheric pressure and the pressure inside the sealed chamber 120 is at some pressure less than atmospheric pressure. As shown in FIG. 7, when the laminated part 100 is positioned within the sealed chamber 120 and the pressure within the sealed chamber 120 is reduced to some pressure P2 below the pressure P1, the pressure within the internal pockets 118 of the laminated part 100 remains at the pressure P1. The higher pressure P1 within the internal pockets 118 causes the gas (e.g., air) within the internal pockets 118 to expand, which causes the first layer 102 and the second layer 104 to deform outwardly away from the opening 110 in the intermediate layer 106. In other words, the pressure differential allows the volume of the internal pockets 118 to increase, thus creating corresponding bulges 130 in the first layer 102 and the second layer 104 due to the deformation of the first layer 102 and the second layer 104.

Figure 12:
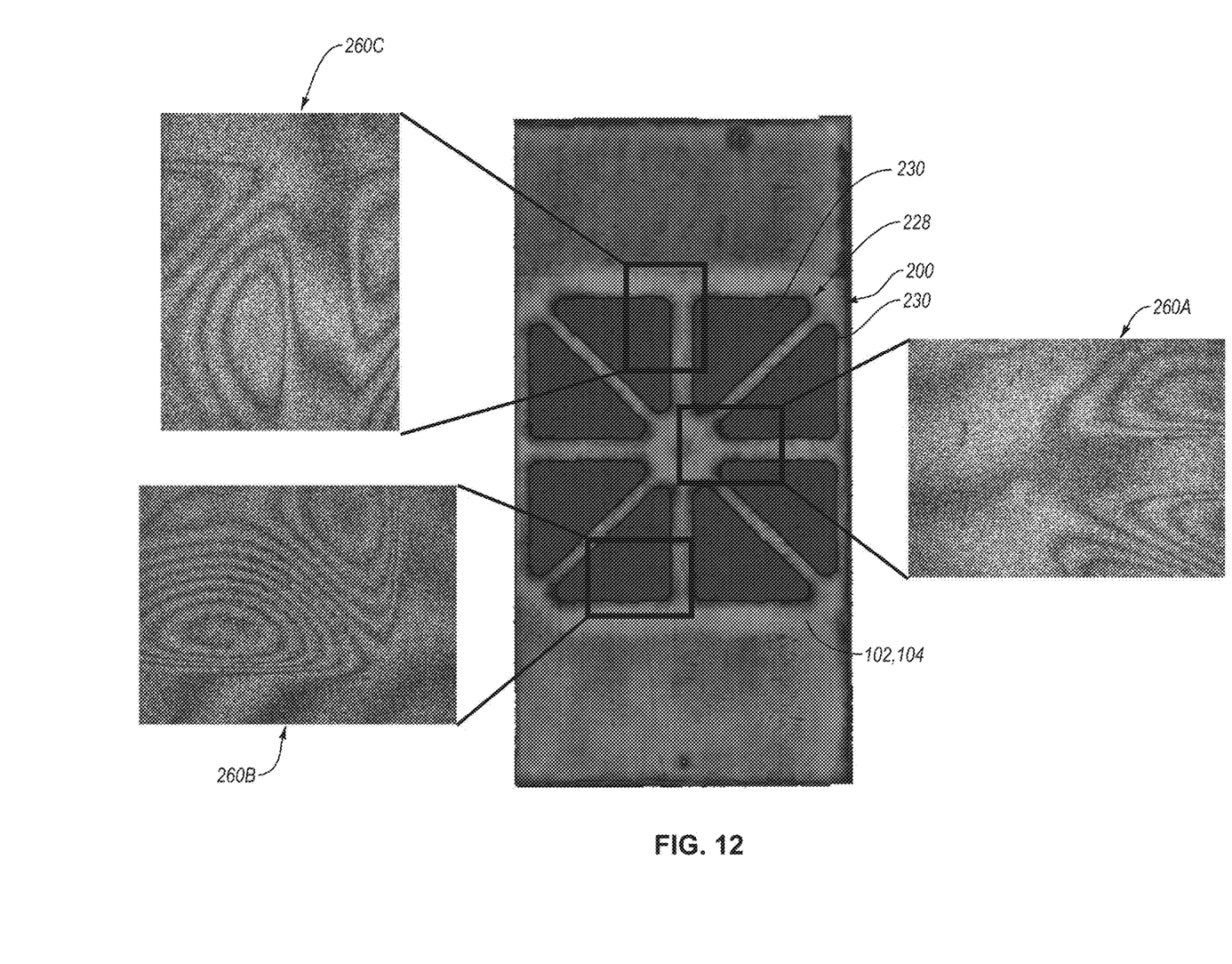
FIG. 12 is a digital image of a laminated part and several shearographically-generated digital images of the gradient of change of the surface profile of corresponding portions of a laminated part, according to one or more examples of the present disclosure.

The method 400 additionally includes (block 430) measuring a gradient of change of the surface profile of the laminated part 100 when the pressure within the sealed chamber 120 is reduced to below the pressure outside the sealed chamber 120. The gradient of change of the surface profile is defined by the bulge(s) 130 formed in the laminated part 100 due to the pressure differential. In some examples, when the interior 122 is at the second pressure P2, block 430 of the method 400 measures the bulges 130 in the first layer 102 and/or the second layer 104. The measurement at block 430 can be obtained from one or more digital images obtained from the shearography apparatus 302 of the system 300 as described above. Examples of digital images generated by a shearography apparatus, such as the shearography apparatus 302, from which measurements of the gradient of change of surface profiles (e.g., bulges) can be obtained include digital images 260A-C in FIG. 12. The digital images 260A-C graphically illustrate or represent the actual surface profiles of the laminated part 100 and provide a measurable gradient of change of the surface profiles. Each one of the digital images 260A-C is a graphical representation of a particular portion of a laminated part 200 under inspection. Accordingly, the digital images 260A-C capture representations of the gradient of change of different bulges 230, corresponding to different internal pockets, of a pattern 228 of bulges 230.

Referring again to FIG. 14, the method 400 also includes (block 440) determining the condition of the secondary bond(s) 114 of the laminated part 100 based on the gradient of change of the surface profile of the laminated part 100. In one example, the condition of the second bond(s) 114 is determined by comparing the gradient of change of the surface profile (e.g., bulge(s) 130) of the laminated part 100 with a predetermined configuration of the internal pocket(s) 118. Generally, if the gradient of change of the surface profile does not correspond with (e.g., match) an expected gradient of change, based on the predetermined configuration of the internal pockets(s) 118, then the condition of one or more of the secondary bond(s) 114 is bad or less than optimal. The comparison can be a one-to-one comparison or one bulge 130 to one internal pocket 118 or a group comparison or a comparison between a measured pattern of bulges 130 with a predetermined pattern of internal pockets 118. Moreover, the comparison can be done for an entire laminated part, over a large area, at the same time, which helps to reduce the time necessary to accurately inspect secondary bonds in relatively large laminated parts.

Figure 10:
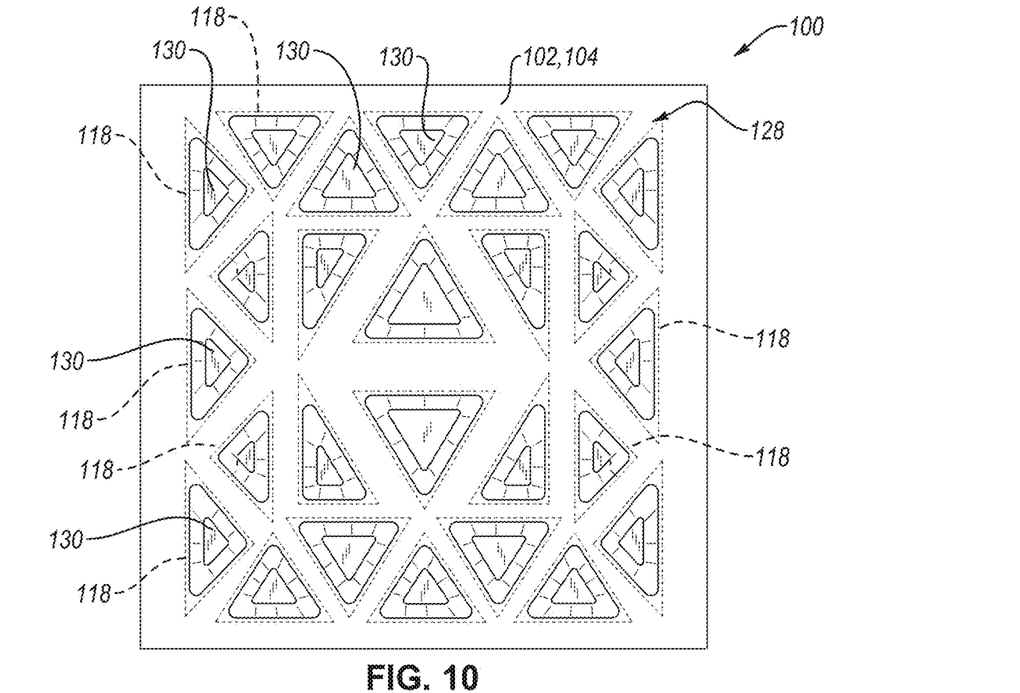
FIG. 10 is a top plan view of a laminated part, having good secondary bonds, being subjected to the second pressure, according to one or more examples of the present disclosure.

In the example of FIGS. 7 and 10, the secondary bonds 114 are all good. Accordingly, the size, shape, and location of each one of the bulges 130 corresponds with the size, shape, and location of a corresponding one of the internal pockets 118. In other words, the pattern 128 of bulges 130 corresponds with the pattern 108 of internal pockets 118. Referring to FIG. 6, each internal pocket 118 has some dimension D1, which can be a maximum dimension of the internal pocket 118. Similarly, referring to FIG. 7, each bulge 130 has some dimension D2, which can be a maximum dimension of the bulge 130. If the secondary bond 114 adjacent an internal pocket 118 is properly formed (e.g., is in a good condition), then the dimension D2 of the corresponding bulge 130 will be same as or proportional to the dimension D1 of the internal pocket 118. The dimension D1 can be synonymous with a location or a shape of the internal pocket 118 and the dimension D2 can be synonymous with the location or the shape of the bulge 130 for determining the quality of the secondary bond 114, such that the secondary bond 114 adjacent an internal pocket 118 is properly formed when the location or shape of the corresponding bulge 130 is the same as or proportional to the location or shape of the internal pocket 118.

Figure 8:
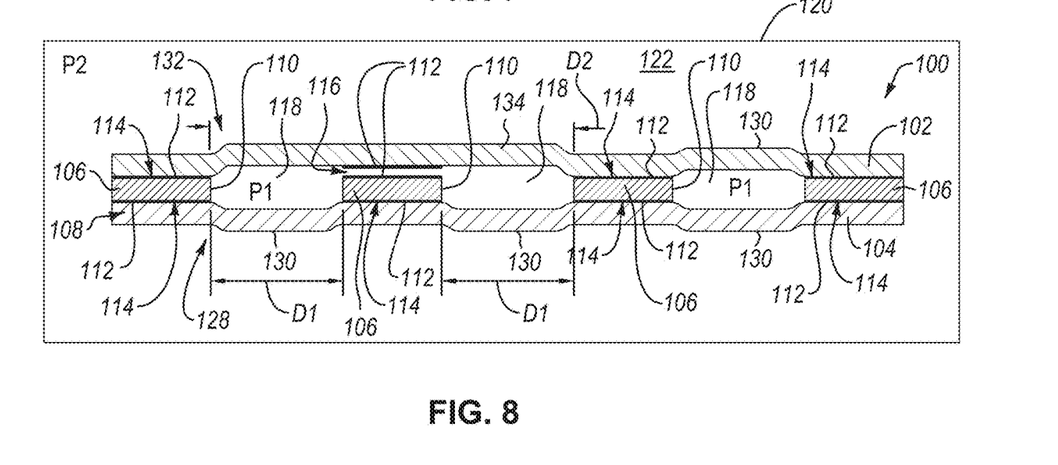
FIG. 8 is a cross-sectional side elevation view of the laminated part of FIG. 1, taken along the line 3-3 of FIG. 1, shown positioned within a sealed chamber at the second pressure and having a bad secondary bond, according to one or more examples of the present disclosure.
Figure 11:
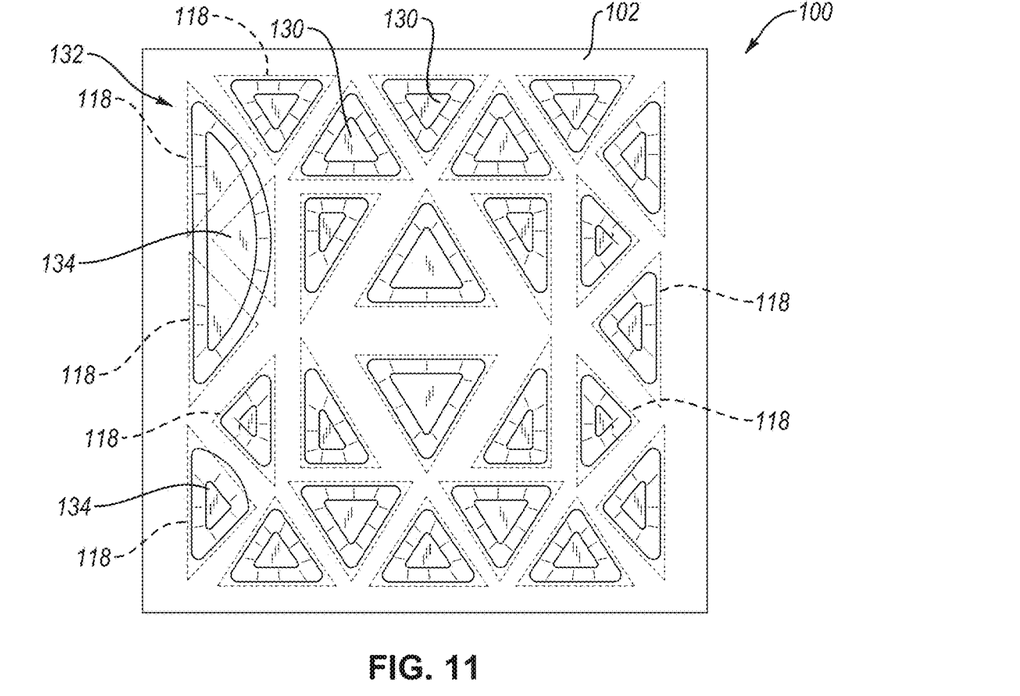
FIG. 11 is a top plan view of a laminated part, having a bad secondary bond, being subjected to the second pressure, according to one or more examples of the present disclosure.

Contrary to the example of FIGS. 7 and 10, in the example of FIGS. 8 and 11, one of the secondary bonds 114 is bad. Accordingly, one of the size, shape, and location of one of the bulges 130 does not correspond with the same one of the size, shape, and location of the corresponding one of the internal pockets 118. In other words, an irregular pattern 132 of bulges 130 does not correspond with the pattern 108 of internal pockets 118. Referring to FIG. 8, the dimension D2 of the bulge 134 is not the same as or does not correspond with the dimension D1 of the corresponding internal pocket 118. More specifically, the dimension D2 of the bulge 134 is larger than the dimension D1 of the internal pocket 118, which indicates a secondary bond 114 has failed.

Figure 9:
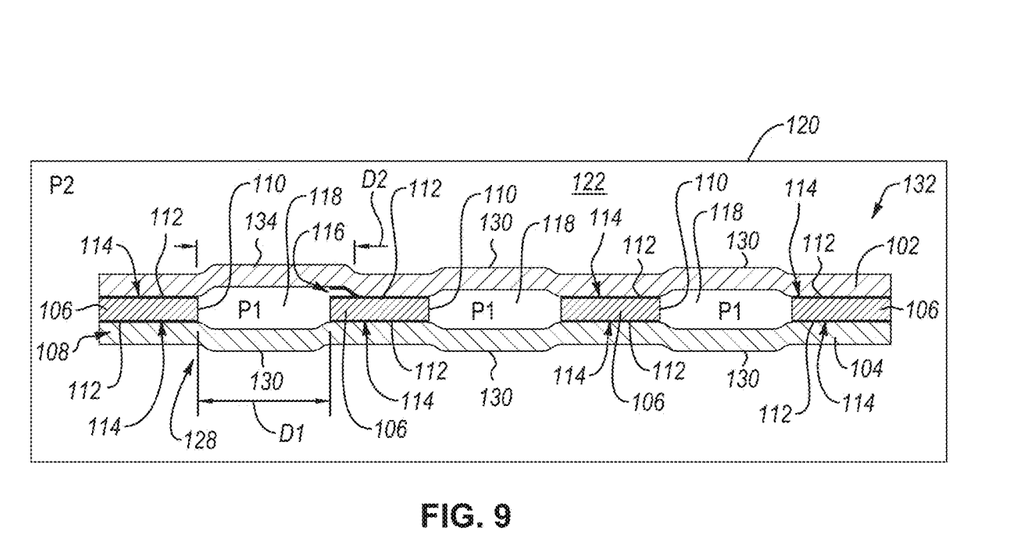
FIG. 9 is a cross-sectional side elevation view of the laminated part of FIG. 1, taken along the line 3-3 of FIG. 1, shown positioned within a sealed chamber at the second pressure and having a bad secondary bond, according to one or more examples of the present disclosure.

As shown in FIG. 8, when a secondary bond 114, between internal pockets 118, has entirely failed, adjacent internal pockets 118, in effect, join together to form a combined internal pocket that spans the secondary bond 114, thus creating a larger-than-expected bulge 134A in the first layer 102. Even when a secondary bond 114 has not entirely failed, such as when just a portion of a secondary bond 114 between adjacent internal pockets 118 has failed as shown in FIG. 9, the dimension D2 of the resultant bulge (see, e.g., bulge 134B of FIG. 11) is still greater than dimension D1 of the corresponding internal pocket 118. Accordingly, determining whether a secondary bond 114 has failed can be fairly easily determined by comparing the predetermined configuration (e.g., size, shape, or location) of an internal pocket 118 or an expected bulge configuration to an actual (e.g., imaged) bulge to see if the actual bulge corresponds (e.g., matches up) with the predetermined configuration of the internal pocket 118 and/or the expected configuration of the actual bulge.

Although in the illustrated examples, the abnormal bulge 134 is formed in the first layer 102, where the laminated part 100 has a second layer 104 and an intermediate layer 106 between the first layer 102 and the second layer 104, an abnormal bulge 134 could also be formed in the second layer 104 indicating a failed secondary bond between the second layer 104 and the intermediate layer 106.

The ability of the first layer 102 or the second layer 104 to deform or bulge is at least partially based on the dimension D1 of the internal pockets 118, the type of material of which the first layer 102 or the second layer 104 is made, and the thickness t of the first layer 102 or the second layer 104 (see, e.g., FIG. 3). If the dimension D1 is too small, the ability of the first layer 102 or the second layer 104 to deform in a reduced pressure environment may be restricted. Similarly, if the material of the first layer 102 or the second layer 104 is too rigid or too thick, the ability of the first layer 102 or the second layer 104 to deform in a reduced pressure environment may be restricted. Accordingly, the dimension D1 of the internal pockets 118, the material type of the first layer 102 or the second layer 104, and/or the thickness t of the first layer or the second layer 104 is selected to provide the necessary strength of the laminated part 100 in its intended use, as well as to allow the first layer 102 or the second layer 104 to bulge in an environment with a sufficiently reduced pressure.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

What is claimed is:

1. A method of inspecting a secondary bond of a laminated part, the method comprising:
positioning the laminated part within a sealed chamber;
when the laminated part is positioned within the sealed chamber, reducing a pressure within the sealed chamber to below a pressure outside the sealed chamber;
when the pressure within the sealed chamber is reduced to below the pressure outside the sealed chamber, measuring a gradient of change of a surface profile of the laminated part; and
determining a condition of the secondary bond based on the gradient of change of the surface profile of the laminated part,
wherein:
the laminated part comprises an internal pocket;
the step of determining the condition of the secondary bond comprises determining the condition of the secondary bond as good when the gradient of change of the surface profile of the laminated part indicates a bulge in the laminated part having a size, shape, and location corresponding with a size, shape, and location of the internal pocket; and
the step of determining the condition of the secondary bond comprises determining the condition of the secondary bond as bad when the gradient of change of the surface profile of the laminated part indicates the bulge in the laminated part has a size that is bigger than the size of the internal pocket.

2. The method according to claim 1, wherein the gradient of change of the surface profile of the laminated part is measured using a laser shearography process.

3. The method according to claim 1, wherein:
the laminated part further comprises a plurality of internal pockets spaced apart from each other; and
the step of determining the condition of the secondary bond further comprises determining the condition of the secondary bond as bad when the bulge traverses at least two of the plurality of internal pockets.

4. The method according to claim 1, wherein:
the laminated part comprises an internal pocket having a predetermined configuration; and
the step of determining the condition of the secondary bond comprises comparing the gradient of change of the surface profile of the laminated part with the predetermined configuration of the internal pocket.

5. The method according to claim 1, wherein:
the laminated part further comprises a plurality of internal pockets arranged in a predetermined pattern; and
the step of determining the condition of the secondary bond comprises comparing the gradient of change of the surface profile of the laminated part with the predetermined pattern of the plurality of internal pockets.

6. The method according to claim 1, wherein the laminated part comprises:
a first layer;
an intermediate layer adjacent the first layer; and
at least a portion of an adhesive between the intermediate layer and the first layer that bonds the intermediate layer to the first layer and forms the secondary bond between the intermediate layer and the first layer.

7. The method according to claim 6, wherein the first layer comprises a plurality of sub-layers.

8. The method according to claim 6, wherein:
the intermediate layer comprises an opening; and
the internal pocket is defined by the opening and the first layer.

9. The method according to claim 1, wherein the laminated part comprises:
a first layer;
a second layer;
an intermediate layer interposed between the first layer and the second layer; and
an adhesive between the intermediate layer and the first layer, the adhesive bonding the intermediate layer to the first layer and forming a first secondary bond between the intermediate layer and the first layer, and between the intermediate layer and the second layer, the adhesive bonding the intermediate layer to the second layer and forming a second secondary bond between the intermediate layer and the first layer;
wherein the secondary bond of the laminated part, the condition of which is determined based on the gradient of change of the surface profile of the laminated part, is any one of the first secondary bond or the second secondary bond.

10. The method according to claim 9, wherein:
the intermediate layer comprises an opening that extends entirely through a thickness of the intermediate layer; and
the internal pocket is defined by the opening, the first layer, and the second layer.

11. The method according to claim 10, wherein each of the first layer, the second layer, and the intermediate layer comprises one or more layers of fiber-reinforced polymeric material.

12. A method of inspecting a secondary bond of a laminated part, the method comprising:
positioning the laminated part within a sealed chamber;
when the laminated part is positioned within the sealed chamber, reducing a pressure within the sealed chamber to below a pressure outside the sealed chamber;
when the pressure within the sealed chamber is reduced to below the pressure outside the sealed chamber, measuring a gradient of change of a surface profile of the laminated part; and
determining a condition of the secondary bond based on the gradient of change of the surface profile of the laminated part,
wherein:
the laminated part comprises a plurality of internal pockets spaced apart from each other;
the gradient of change of the surface profile of the laminated part indicates a plurality of bulges in the laminated part;
the condition of the secondary bond is determined as good when the size, shape, and location of each one of the plurality of bulges corresponds with the size, shape, and location of a corresponding one of the plurality of internal pockets; and
the condition of the secondary bond is determined as bad when the size, shape, and location of any one of the plurality of bulges does not correspond with the size, shape, and location of the corresponding one of the plurality of internal pockets.

13. The method according to claim 12, wherein the laminated part comprises:
a first layer;

an intermediate layer adjacent the first layer; and
at least a portion of an adhesive between the intermediate layer and the first layer that bonds the intermediate layer to the first layer and forms the secondary bond between the intermediate layer and the first layer.

14. The method according to claim 13, wherein the first layer comprises a plurality of sub-layers.

15. A method of inspecting a secondary bond of a laminated part, the method comprising:
positioning the laminated part within a sealed chamber;
when the laminated part is positioned within the sealed chamber, reducing a pressure within the sealed chamber to below a pressure outside the sealed chamber;
when the pressure within the sealed chamber is reduced to below the pressure outside the sealed chamber, measuring a gradient of change of a surface profile of the laminated part; and
determining a condition of the secondary bond based on the gradient of change of the surface profile of the laminated part,
wherein:
the laminated part comprises an internal pocket having a predetermined configuration;
the step of measuring the gradient of change of the surface profile of the laminated part comprises creating a first digital image of the gradient of change of the surface profile of the laminated part; and
the step of determining the condition of the secondary bond comprises automatedly comparing the first digital image of the gradient of change of the surface profile of the laminated part with a second digital image comprising a representation of the internal pocket having the predetermined configuration.

16. The method according to claim 15, wherein the laminated part comprises:
a first layer;
an intermediate layer adjacent the first layer; and
at least a portion of an adhesive between the intermediate layer and the first layer that bonds the intermediate layer to the first layer and forms the secondary bond between the intermediate layer and the first layer.

17. The method according to claim 16, wherein the first layer comprises a plurality of sub-layers.

18. A system for inspecting a secondary bond of a laminated part, comprising an internal pocket, the system comprising:
a sealed chamber, configured to contain the laminated part in a sealed environment;
a vacuum device, configured to reduce pressure within the sealed chamber to below a pressure outside the sealed chamber;
a shearography apparatus, configured to measure a gradient of change of a surface profile of the laminated part; and
a comparison module, configured to determine a condition of the secondary bond based on the gradient of change of the surface profile of the laminated part, analyze the gradient of change of the surface profile of the laminated part measured by the shearography apparatus, determine the condition of the secondary bond as good when the gradient of change of the surface profile of the laminated part indicates a bulge in the laminated part having a size, shape, and location corresponding with a size, shape, and location of the internal pocket, determine the condition of the secondary bond as bad when the gradient of change of the surface profile of the laminated part indicates a bulge in the laminated part having a size, shape, and location that does not correspond with the size, shape, and location of the internal pocket,
wherein:
the internal pocket has a predetermined configuration;
the shearography apparatus is configured to create a first digital image of the gradient of change of the surface profile of the laminated part; and
the comparison module is configured to:
automatedly compare the first digital image of the gradient of change of the surface profile of the laminated part with a second digital image comprising a representation of the internal pocket having the predetermined configuration; and
determine the condition of the secondary bond based on the comparison of the first digital image with the second digital image.

19. The system according to claim 18, wherein:
the laminated part further comprises a plurality of internal pockets spaced apart from each other according to a predetermined pattern; and
the second digital image comprises a representation of the plurality of internal pockets arranged in the predetermined pattern.

20. The system according to claim 18, wherein:
the laminated part further comprises a plurality of internal pockets;
the gradient of change of the surface profile of the laminated part indicates a plurality of bulges in the laminated part;
the comparison module determines the condition of the secondary bond as good when a size, shape, and location of each one of the plurality of bulges corresponds with a size, shape, and location of a corresponding one of the internal pockets; and
the comparison module determines the condition of the secondary bond as bad when the size, shape, and location of any one of the plurality of bulges does not correspond with the size, shape, and location of the corresponding one of the plurality of internal pockets.

* * * * *